United States Patent
Li

(10) Patent No.: US 10,263,304 B2
(45) Date of Patent: Apr. 16, 2019

(54) THERMAL MANAGEMENT SYSTEM OF BATTERY PACK

(71) Applicant: CONTEMPORARY AMPEREX TECHNOLOGY CO., LIMITED, Ningde, Fujian Province (CN)

(72) Inventor: Qing Li, Ningde (CN)

(73) Assignee: CONTEMPORARY AMPEREX TECHNOLOGY CO., LIMITED, Ningde (CN)

( * ) Notice: Subject to any disclaimer, the term of this patent is extended or adjusted under 35 U.S.C. 154(b) by 198 days.

(21) Appl. No.: 15/299,052

(22) Filed: Oct. 20, 2016

(65) Prior Publication Data
US 2017/0256834 A1 Sep. 7, 2017

(30) Foreign Application Priority Data
Mar. 2, 2016 (CN) .......................... 2016 1 0116594

(51) Int. Cl.
*B60H 1/00* (2006.01)
*F16K 31/06* (2006.01)
(Continued)

(52) U.S. Cl.
CPC ...... *H01M 10/663* (2015.04); *B60H 1/00278* (2013.01); *F16K 31/0603* (2013.01);
(Continued)

(58) Field of Classification Search
CPC ............. H01M 10/663; H01M 10/625; H01M 10/6568; H01M 2220/20; B60H 1/00278; F16K 31/0603
See application file for complete search history.

(56) References Cited

U.S. PATENT DOCUMENTS 3,110,633 A * 11/1963 Bachmann .......... H01M 10/625
123/142.5 E
5,731,568 A * 3/1998 Malecek ............ B60H 1/00278
180/68.5
(Continued)

FOREIGN PATENT DOCUMENTS

CN 201893429 U 7/2011
CN 202797185 U * 3/2013
(Continued)

OTHER PUBLICATIONS www.espacenet.com machine translation of CN 202797185-U (Year: 2013).*
(Continued)

*Primary Examiner* — Gregg Cantelmo
(74) *Attorney, Agent, or Firm* — Tucker Ellis LLP

(57) ABSTRACT

The present invention provides a thermal management system of a power battery pack, including a heating branch, a cooling branch and a battery pack pipeline, the heating branch and the cooling branch are connected with the battery pack pipeline and are arranged in parallel and configured to enable switching, a first heat exchanger for absorbing heat from a cooling liquid pipe of an outer high-temperature device is arranged on the heating branch. The thermal management system of the battery pack provided by the present invention uses waste heat of the cooling liquid of other high-temperature devices on the electric vehicle to heat the battery pack, so as to avoid the problem of electric power consuming and cruising distance reduction. Meanwhile improving cooling efficiency of high-temperature devices, and then improve comprehensive energy utilization efficiency, and improve working condition of the whole vehicle, thereby improving comprehensive performance of the electric vehicle.

8 Claims, 1 Drawing Sheet

(51) Int. Cl.
　　　*H01M 10/625* 　　(2014.01)
　　　*H01M 10/663* 　　(2014.01)
　　　*H01M 10/6568* 　(2014.01)

(52) U.S. Cl.
　　　CPC ..... *H01M 10/625* (2015.04); *H01M 10/6568* (2015.04); *H01M 2220/20* (2013.01)

(56) References Cited

U.S. PATENT DOCUMENTS

| | | | |
|---|---|---|---|
| 2001/0040061 A1* | 11/2001 | Matuda | B60H 1/00278 180/68.2 |
| 2012/0152186 A1 | 6/2012 | Sujan et al. | |
| 2012/0241129 A1* | 9/2012 | Kohl | B60H 1/00278 165/58 |
| 2012/0301755 A1* | 11/2012 | Axelsson | B60K 6/48 429/62 |
| 2013/0111932 A1* | 5/2013 | Mishima | F25B 29/00 62/79 |

FOREIGN PATENT DOCUMENTS

| | | | | |
|---|---|---|---|---|
| CN | 103280609 A | | 9/2013 | |
| DE | 102009025596 A1 | * | 2/2010 | ............ F24D 17/02 |
| DE | 102009035456 A1 | | 2/2011 | |
| JP | 2010272289 | | 12/2010 | |
| JP | 2012226895 | | 11/2012 | |
| JP | 2014127322 | | 7/2014 | |
| WO | 2015103548 A1 | | 7/2015 | |

OTHER PUBLICATIONS

European Patent Office, Search Report and Written Opinion for counterpart European Patent Application No. EP16191183.9, dated Dec. 21, 2016.

Japanese Office Action from corresponding Japanese Application No. 2016-112051, dated Mar. 28, 2017.

Chinese Office Action from corresponding Chinese Application No. 201610116594.1, dated Aug. 23, 2017.

\* cited by examiner

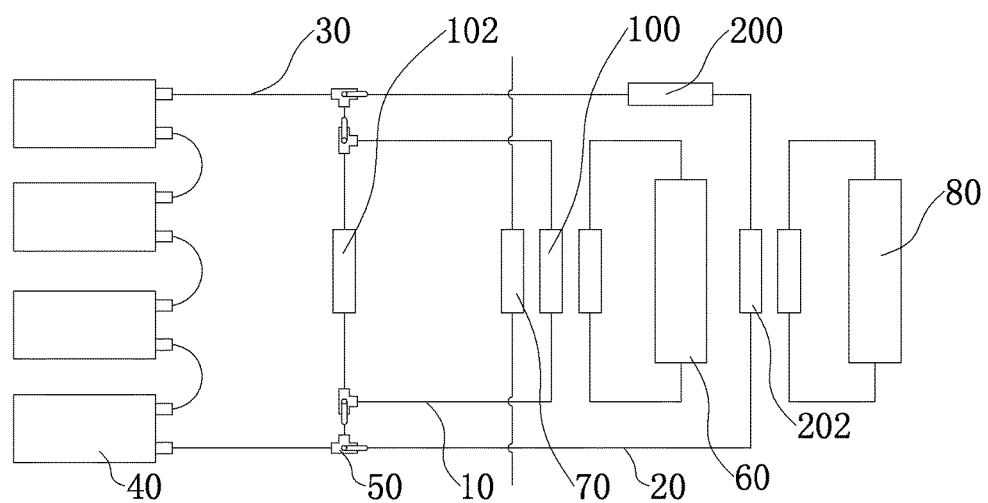

THERMAL MANAGEMENT SYSTEM OF BATTERY PACK

CROSS-REFERENCE TO RELATED APPLICATIONS

The present application claims priority to Chinese Patent Application No. 201610116594.1, filed on Mar. 2, 2016, the content of which is incorporated herein by reference in its entirety.

TECHNICAL FIELD

The present invention relates to a thermal management system of a battery pack and, particularly, to a thermal management system of a power battery pack.

BACKGROUND

At present, more and more attention has been paid to the development of electric vehicle. As the power source of the electric vehicle, the Li-ion battery performs best charge-discharge performance and longest service life when the working temperature thereof is within 20-40 degrees. Therefore, in the prior art, a temperature control system is generally adopted to control the temperature in a battery pack.

In the prior art, a manner of connecting an electric heater and a cooling unit set in series in a circulation loop is generally adopted, the working medium in the circulation loop is heated or cooled by controlling the open-close state of the electric heater and the cooling unit set, so as to implement controlling of the temperature in the battery pack.

However, the electric heater in the prior art needs the electric power in the battery pack as power source, which will reduce the cruising distance of the electric vehicle, particularly obvious in the cold environment.

SUMMARY

The objective of the present invention is to provide a thermal management system of a battery pack, which can improve the cruising distance of an electric vehicle effectively.

The objective of the present invention is achieved by the following technical solutions: a thermal management system of a battery pack, including a heating branch, a cooling branch, a battery pack pipeline, the heating branch and the cooling branch are both connected with the battery pack pipeline, and the heating branch and the cooling branch are arranged in parallel and configured to enable switching, a first heat exchanger used for absorbing heat from a cooling liquid pipe of an outer high-temperature device is arranged on the heating branch.

Preferably, an outer liquid pouring pipeline is also included, a pouring opening is provided at an end of the outer liquid pouring pipeline, the first heat exchanger is configured to exchange heat with the outer liquid pouring pipeline.

Preferably, an electric heater is further arranged on the heating branch.

Preferably, a connecting end used for connecting with an outer power supply is arranged on the electric heater.

Preferably, the electric heater and the first heat exchanger are arranged in parallel and configured to enable switching.

Preferably, the electric heater and the first heat exchanger are arranged in series.

Preferably, a radiator is arranged on the cooling branch.

Preferably, an independent cooling unit set is also included, and a second heat exchanger used for exchanging heat with the independent cooling unit set is arranged on the cooling branch.

Preferably, the heating branch, the cooling branch and the battery pack pipeline are connected through a three-way valve.

Preferably, the three-way valve is an electromagnetic three-way valve.

Compare to the prior art, the present invention has the following beneficial effects:

The thermal management system of the battery pack provided by the present invention uses the waste heat of the cooling liquid of other high-temperature devices on the electric vehicle to heat the battery pack, so as to avoid the problem of consuming the electric power of the battery pack itself, and avoid the problem of cruising distance reduction of the electric vehicle. At the same time, the temperature of the cooling liquid of the high-temperature devices can be further reduced, so as to improve the cooling efficiency of the high-temperature devices, and then improve the comprehensive energy utilization efficiency, and improve the working condition of the whole vehicle, thereby improving the comprehensive performance of the electric vehicle.

BRIEF DESCRIPTION OF DRAWINGS

The FIGURE is a principle block diagram of a thermal management system of a battery pack according to the present invention.

DESCRIPTION OF EMBODIMENTS

Hereinafter, embodiments of a thermal management system of a battery pack according to the present invention will be introduced with reference to the FIGURE.

As shown in the FIGURE, the thermal management system of the battery pack provided by the present embodiment includes a heating branch 10, a cooling branch 20 and a battery pack pipeline 30, and further includes components such as a sensor, a control system etc. The key point of the present invention is on the improvement of the pipeline structure, therefore the components such as the sensor and the control system etc. are all conventional, which will not be illustrated here. The present embodiment mainly describes the heating branch 10, the cooling branch 20 and the battery pack pipeline 30. Both of the heating branch 10 and the cooling branch 20 are connected with the battery pack pipeline 30, when connecting, it should be guaranteed that the heating branch 10 is connected with the cooling branch 20 in parallel and then switching can be achieved therebetween, that is, both of them can form a closed loop with the battery pack pipeline 30, respectively. The heating branch 10 forms a heating loop with the battery pack pipeline 30 so as to heat a battery pack 40, and the cooling branch 20 forms a cooling loop with the battery pack pipeline 30 so as to cool the battery pack 40.

For the switching manner, it is possible to arrange a valve at both ends of each branch respectively. However, such manner is of a complex structure and is difficult to control. The best manner is to connect the heating branch 10, the cooling branch 20 and the battery pack pipeline 30 together through a three-way valve 50 so as to simplify control structure. An electromagnetism three-way valve is recommended, which has advantages of reliable structure and high control precision etc.

In the present embodiment, a first heat exchanger 100 needs to be arranged on the heating branch 10, which is used for absorbing heat from a cooling liquid pipe 60 of outer high-temperature devices (such as engine of electric vehicle). Taking the engine of an electric vehicle as an example, when the vehicle is moving, due to the high speed running, the engine itself will also generate a large amount of heat while generating kinetic energy. However, the accumulation of heat will significantly influence normal operation of the engine itself and other components of the electric vehicle even the safety of operation condition, therefore, in the prior art, cooling liquid is needed for cooling. The cooling liquid will be at a high temperature after absorbing the heat of the engine, however in the prior art, this part of heat will not be utilized, which has to be dissipated through the cooling system of the electric vehicle, and then recycled and used again.

However, in the present embodiment, since the first heat exchanger 100 is arranged, the working medium in the heating loop can absorb the heat of the high-temperature cooling liquid through the first heat exchanger 100 and then is heated to a high temperature, thus the temperature of the battery pack 40 can be risen by the heat. Therefore, the temperature rising process of the battery pack 40 will no longer consume the electric power of the battery pack 40 itself, which will not affect the cruising distance of the electric vehicle. At the same time, the heat of the cooling liquid will be reduced after heat exchanging with the first heat exchanger 100, then the temperature of the cooling liquid will be further lowered through the original cooling system of the electric vehicle, so as to improve the cooling efficiency of the cooling liquid for the high-temperature devices, and improve comprehensive energy utilization efficiency, thereby improving the working condition of the whole vehicle, and improving comprehensive performance of the electric vehicle.

It should be noted that, since the cooling liquid is in a working state during the whole driving process of the electric vehicle, the heat exchanger 100 will continuously exchange heat with the cooling liquid. Therefore, if the heating branch 10 is connected in series with the cooling branch 20, the working medium of the whole circulation loop will be heated all the time. Such situation is so disadvantageous for cooling of the battery pack 40 that may even lead to completely loss of the cooling function. Therefore, the present embodiment adopts the manner of connecting the heating branch 10 and the cooling branch 20 in parallel, the access state of the first heat exchanger 100 can be controlled through switching between branches, so as to avoid the working medium in circulation state from being heated in unnecessary situations.

As shown in the FIGURE, in the present embodiment, an outer liquid pouring pipeline 70 can also be included, a pouring opening (not shown in drawings) is provided at an end of the outer liquid pouring pipeline 70, the first heat exchanger 100 can exchange heat with the outer liquid pouring pipeline 70. When the vehicle is not started, the high-temperature devices of the electric vehicle are not operating to provide heat. At this time, high-temperature fluid can be poured into the outer liquid pouring pipeline 70 through the pouring opening, and the working medium can absorb the heat in the high-temperature fluid through the first heat exchanger 100, so as to heat the battery pack 40. Or, a further electric heater 102 can be arranged on the heating branch 10, so that the electric heater 102 can use the electric power of the battery pack 40 to heat the working medium. A connecting end (not shown in drawings) used to connect with an outer electric supply (such as a charging pile) can be arranged on the electric heater 102, thus the electric heater 102 can be driven by a charging pile directly in the case there is a charging pile provided, without affecting the charging progress of the battery pack 40.

The first heat exchanger 100 and the electric heater 102 can be arranged in series, or arranged in parallel (the FIGURE shows the parallel arrangement). Moreover, when adopting the parallel arrangement, the first heat exchanger 100 and the electric heater 102 can be switched to be used alone or together.

In the present embodiment, the cooling branch 20 can use the cooling unit set of the electric vehicle for cooling, however, since the air-conditioner and other components of the electric vehicle need to be cooled by the cooling unit set of the electric vehicle either, therefore, a one-for-two problem may happen to the cooling unit set when the huge heat is generated or the environmental temperature is high, which is easy to cause reduction of the cooling effect. At the same time, the problems of compressor model selection and integration of the cooling unit set will also occur.

Therefore, the present embodiment recommends adopting the following manners for cooling. The first manner is to arrange a radiator 200 on the cooling branch 20. The radiator 200 can adopt an air cooling manner or a water cooling manner, for example in the air cooling manner, the heat on the surface of the radiator 200 can be taken away by the cold air of the outer environment driven by a fan. In the water cooling manner, the radiator 200 can be immersed into the interior of a water tank, the water tank can facilitate the battery pack 40 to be cooled rapidly through filling cold water or ice cubes therein from the outside. The second manner is to assemble an independent cooling unit set 80, at the same time arranging a second heat exchanger 202 on the cooling branch 20, the second heat exchanger 202 is used to exchange heat with the independent cooling unit set 80, so as to cool the working medium in the cooling loop. The two manners can be used alone or together. When used together, it is preferred to adopt a serial arrangement, the second heat exchanger 202 is arranged at the downstream of the radiator 200, so as to achieve a graded cooling, thereby improving the cooling effect.

The thermal management system of the battery pack of the present embodiment avoids the problem of consuming the power of the battery pack 40 itself during the heating process, and the problem of cruising distance reduction of the electric vehicle. Meanwhile the comprehensive energy utilization efficiency is improved, and the working condition of the whole vehicle is improved, thereby improving the comprehensive performance of the electric vehicle.

The above described are only part of the embodiments of the present application, but not all of them, any equivalent variations made by those skilled in the art to the technical solutions of the present application after reading the specification of the present application shall be covered by the claims of the present application.

What is claimed is:

1. A thermal management system of a battery pack, comprising a heating branch, a cooling branch, a battery pack pipeline and an independent cooling unit set, the heating branch and the cooling branch are both connected with the battery pack pipeline, and the heating branch and the cooling branch are arranged in parallel and configured to enable switching, a first heat exchanger used for absorbing heat from a cooling liquid pipe of an outer high-temperature device is arranged on the heating branch, a radiator is arranged on the cooling branch, a second heat exchanger used for exchanging heat with the independent cooling unit set is arranged on the cooling branch and at the downstream of the radiator.

2. The thermal management system of the battery pack according to claim 1, further comprising an outer liquid pouring pipeline, wherein a pouring opening is provided at an end of the outer liquid pouring pipeline, the first heat exchanger is configured to exchange heat with the outer liquid pouring pipeline.

3. The thermal management system of the battery pack according to claim 1, wherein an electric heater is further arranged on the heating branch.

4. The thermal management system of the battery pack according to claim 3, wherein a connecting end used for connecting with an outer power supply is arranged on the electric heater.

5. The thermal management system of the battery pack according to claim 3, wherein the electric heater and the first heat exchanger are arranged in parallel and configured to enable switching.

6. The thermal management system of the battery pack according to claim 3, wherein the electric heater and the first heat exchanger are arranged in series.

7. The thermal management system of the battery pack according to claim 1, wherein the heating branch, the cooling branch and the battery pack pipeline are connected through a three-way valve.

8. The thermal management system of the battery pack according to claim 7, wherein the three-way valve is an electromagnetic three-way valve.

* * * * *